United States Patent
Loo et al.

(10) Patent No.: US 9,531,091 B2
(45) Date of Patent: Dec. 27, 2016

(54) CABLE CONNECTING STRUCTURE OF BATTERY PACK

(71) Applicant: MITSUBISHI JIDOSHA KOGYO KABUSHIKI KAISHA, Tokyo (JP)

(72) Inventors: Weng Leong Loo, Chiryu (JP); Seiichi Takasaki, Okazaki (JP); Satoshi Miyanaga, Nagoya (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/790,869

(22) Filed: Jul. 2, 2015

(65) Prior Publication Data
US 2016/0006147 A1    Jan. 7, 2016

(30) Foreign Application Priority Data
Jul. 4, 2014   (JP) .................................. 2014-138326

(51) Int. Cl.
*H01R 3/00* (2006.01)
*H01R 11/28* (2006.01)
(Continued)

(52) U.S. Cl.
CPC .............. *H01R 11/282* (2013.01); *B60K 1/04* (2013.01); *B60L 11/1816* (2013.01);
(Continued)

(58) Field of Classification Search
CPC ................... B60L 11/1816; B60K 1/04; B60K 2001/0438; H01R 11/282
(Continued)

(56) References Cited

U.S. PATENT DOCUMENTS 8,905,170 B2 * 12/2014 Kyoden ................... B62M 7/12
                                                                    180/220
9,073,426 B2 *  7/2015 Tachikawa ............... B60K 1/04
                                                                    307/9.1
(Continued)

FOREIGN PATENT DOCUMENTS

JP          2013-251111 A       12/2013
WO     WO 2014/002537 A1     1/2014
WO     WO 2014/034377 A1     3/2014

OTHER PUBLICATIONS

Extended European Search Report issued Dec. 14, 2015 in corresponding European Application No. 15175212.8.

*Primary Examiner* — Tulsidas C Patel
*Assistant Examiner* — Peter G Leigh
(74) *Attorney, Agent, or Firm* — Birch, Stewart, Kolasch & Birch, LLP

(57) ABSTRACT

A cable connecting structure of a battery pack, the battery pack which is provided in a vehicle, the cable connecting structure includes: a plurality of cable side connectors which are provided at ends of a plurality of cables, respectively, and which are connected to the battery pack; and a plurality of battery pack side connectors to which the cable side connectors are detachably mounted, and which are arranged in parallel along a peripheral direction of a peripheral wall of the battery pack. In a state where the cable side connectors are mounted to the battery pack side connectors, portions of the cables which are respectively withdrawn from the cable side connectors are extended along the peripheral wall.

7 Claims, 8 Drawing Sheets

(51) Int. Cl.
*B60K 1/04* (2006.01)
*B60L 11/18* (2006.01)
*H01M 2/10* (2006.01)

(52) U.S. Cl.
CPC ... *B60K 2001/0438* (2013.01); *H01M 2/1077* (2013.01); *H01M 2220/20* (2013.01)

(58) Field of Classification Search
USPC .......................................................... 439/500
See application file for complete search history.

(56) References Cited

U.S. PATENT DOCUMENTS

| | | | |
|---|---|---|---|
| 9,260,065 B2* | 2/2016 | Tanigaki | B60K 1/04 |
| 2013/0161108 A1* | 6/2013 | Watanabe | B62J 11/00 |
| | | | 180/220 |
| 2013/0228389 A1* | 9/2013 | Nakashima | B62K 11/10 |
| | | | 180/220 |
| 2013/0256046 A1 | 10/2013 | Kyoden et al. | |
| 2015/0129334 A1* | 5/2015 | Nagamori | B60K 1/04 |
| | | | 180/65.31 |
| 2015/0136504 A1* | 5/2015 | Tsujimura | H01M 2/1077 |
| | | | 180/68.5 |
| 2015/0147618 A1 | 5/2015 | Nakamori | |
| 2015/0217707 A1 | 8/2015 | Tanigaki et al. | |
| 2016/0006147 A1* | 1/2016 | Loo | B60K 1/04 |
| | | | 439/500 |

\* cited by examiner

CABLE CONNECTING STRUCTURE OF BATTERY PACK

CROSS-REFERENCE TO RELATED APPLICATION(S)

This application is based upon and claims the benefit of priority from prior Japanese patent application No. 2014-138326, filed on Jul. 4, 2014, the entire contents of which are incorporated herein by reference.

BACKGROUND

The present invention relates to a cable connecting structure of a battery pack.

There has been such a vehicle that a battery pack having peripheral faces which are directed in a longitudinal direction and a lateral direction of the vehicle is mounted under floor, and the battery pack is charged with an electric power which is supplied from a charging port by way of two charging cables. This vehicle is driven by actuating an electric motor with the electric power which is supplied from the battery pack (refer to JP-A-2013-251111).

In the vehicle as described above, in view of facilitating a work for wiring the two charging cables, it is considered that the two charging cables are detachably connected to the battery pack by way of a single connector.

Specifically, a single cable side connector is provided in end parts of the two charging cables which are connected to the charging port, and at the same time, a single battery pack side connector to be connected to a battery inside the battery pack is provided on a peripheral face of the battery pack.

However, according to the above described structure, both the cable side connector and the battery pack side connector are single components to which the two cables are respectively connected, and therefore, the connectors must have a large size to some extent.

Accordingly, the peripheral face of the battery pack inevitably has a large size in a vertical direction, which is detrimental in making the battery pack compact.

Moreover, the battery side connector and the cable side connector are so constructed that their axes are perpendicular to the peripheral face of the battery pack, in many cases. Accordingly, the two cables withdrawn from the cable side connector which is mounted to the battery pack side connector is extended in a direction perpendicular to the peripheral face of the battery pack. Therefore, it is disadvantageous that a large space for wiring the cables must be secured around the peripheral face of the battery pack.

SUMMARY

It is an object of the invention to provide a cable connecting structure of a battery pack which is advantageous in making the battery pack compact, and in reducing a space required for wiring the cables.

In order to achieve the above object, according to the invention, there is provided a cable connecting structure of a battery pack, the battery pack which is provided in a vehicle, the cable connecting structure comprising: a plurality of cable side connectors which are provided at ends of a plurality of cables, respectively, and which are connected to the battery pack; and a plurality of battery pack side connectors to which the cable side connectors are detachably mounted, and which are arranged in parallel along a peripheral direction of a peripheral wall of the battery pack, wherein, in a state where the cable side connectors are mounted to the battery pack side connectors, portions of the cables which are respectively withdrawn from the cable side connectors are extended along the peripheral wall.

In a state where the cable side connectors are mounted to the battery pack side connectors, the cables may be extended from the cable side connectors, respectively, so as to be parallel to each other, or may be extended from the cable side connectors in a direction in which the cables are separated from each other.

At least one of the battery pack side connectors which are adjacent to each other may have an axis inclined with respect to the peripheral wall, in a plan view of the battery pack, and the portion of the cable withdrawn from the cable side connector which is mounted to the battery pack side connector the axis of which is inclined may be separated from the peripheral wall, as going away from the battery pack connector the axis of which is inclined.

The battery pack side connectors may have mounting faces to which the cable side connectors are mounted, and the mounting face of one of the battery pack side connectors which are adjacent to each other may be positioned more outward of the battery pack than the mounting face of the other battery pack side connector.

The battery pack side connectors may have mounting faces to which the cable side connectors are mounted, and at least two of the mounting faces of the battery pack side connectors may have the same height from the peripheral wall of the battery pack.

At least two of the cables may be respectively connected to a positive terminal and a negative terminal of a charging port of the vehicle which is connected to an external power supply, and two battery pack side connectors to which the cable side connectors of the at least two cables are mounted may be disposed on one of a frontward face and a rearward face of the peripheral wall of the battery pack which is closer to the charging port.

DETAILED DESCRIPTION OF EXEMPLARY EMBODIMENTS

First Embodiment

Figure 1:
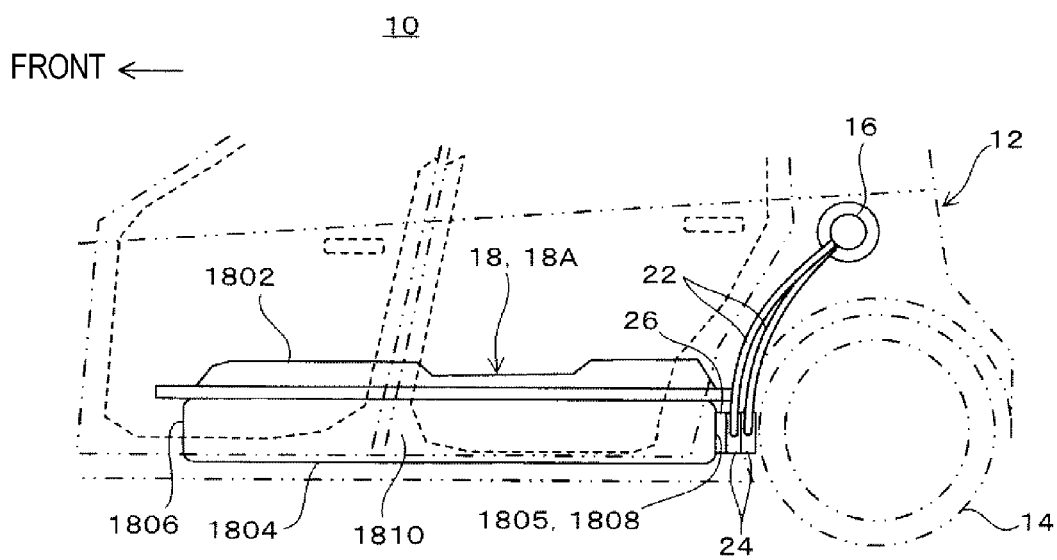
FIG. 1 is a side view showing a rearward part of a vehicle to which a cable connecting structure of a battery pack in a first embodiment is applied.

Now, embodiments according to the invention will be described referring to the drawings.

In the following embodiments, a case where the vehicle to which the cable connecting structure of the battery pack according to the invention is applied is an electric motor car employing only a motor as a driving source will be described. However, the invention is not only applied to the electric motor car, but can be widely applied to other vehicles, provided that the battery pack is provided under floor. For example, the invention can be widely applied to electrically driven cars such as a hybrid car, a plug-in hybrid car, and so on.

As shown in FIG. 1, a vehicle 10 includes a vehicle body 12, a driving motor which is not shown, front wheels which are not shown, rear wheels 14, a quick charging port 16, a battery pack 18, battery pack side connectors 20 (20A, 20B), quick charging cables 22 (22A, 22B), and cable side connectors 24 (24A, 24B).

It is to be noted that this embodiment relates to a cable connecting structure of the battery pack 18 in which a plurality of the cable side connectors 24 are connected to the quick charging port 16, which is an electrical component, at their one ends, and connected to the battery pack 18, at their other ends.

The vehicle body 12 includes a pair of right and left side members, a plurality of cross members, and a floor panel which is provided above these side members and cross members, all of which are not shown.

The floor panel which is disposed in a lower part of the vehicle body is formed of steel sheet, and extended both in a longitudinal direction and in a lateral direction of the vehicle. Both sides in the lateral direction of a lower face of the floor panel are joined to the two side members by welding.

The driving motor is disposed in a rear part of the vehicle body 12, and actuated by an electric power which is supplied from the battery pack 18 via an inverter thereby to rotate the rear wheels 14.

On occasion of externally charging the battery pack 18, a charging gun of a quick charging device, which is an external power supply, is attached to the quick charging port 16 thereby to supply a high voltage electric power. This quick charging port 16 is provided with a positive terminal and a negative terminal, and in this embodiment, this quick charging port 16 is an electrical component.

Moreover, the quick charging port 16 is provided at a position above the rear wheel 14 on a rearward left side face of the vehicle body 12.

The battery pack 18 is disposed below a floor panel 28 between a pair of the right and left side members, and includes a battery for driving, which is not shown, and a battery case 18A which contains this battery.

The battery includes a plurality of battery modules which are connected to each other in series, and peripheral components for enabling these battery modules to function. Each of the battery modules includes a plurality of battery cells which are connected to each other in series.

The battery case 18A has a shape of a rectangular plate in a plan view, and is disposed in a center part in the lateral direction of the vehicle, having its longitudinal direction aligned with a longitudinal direction of the vehicle 10.

The battery case 18A is disposed between a pair of the side members below the floor panel, and fitted to the two side members via a fitting member.

The battery case 18A includes an upper wall 1802 directed upward, a lower wall 1804 directed downward, and a peripheral wall 1805 which is directed in the longitudinal direction and the lateral direction of the vehicle 10, that is, in a direction perpendicular to the vertical direction, for connecting the upper wall 1802 and the lower wall 1804 to each other.

The peripheral wall 1805 includes a front wall 1806 directed to a front side of the vehicle, and a rear wall 1808 directed to a rear side of the vehicle, a left side wall 1810 directed to a left side in the lateral direction, and a right side wall 1812 directed to a right side in the lateral direction.

In this embodiment, a distance between the rear wall 1808 of the battery case 18A and the two rear wheels 14 is small, because the vehicle 10 is a light-duty car or a compact car.

Moreover, components for mechanisms such as a suspension mechanism, a brake mechanism, and various wiring materials are provided between the two rear wheels 14 which have a small distance between them. Therefore, there is a complicated space in rear of the rear wall 1808 of the battery pack 18.

Figure 2:
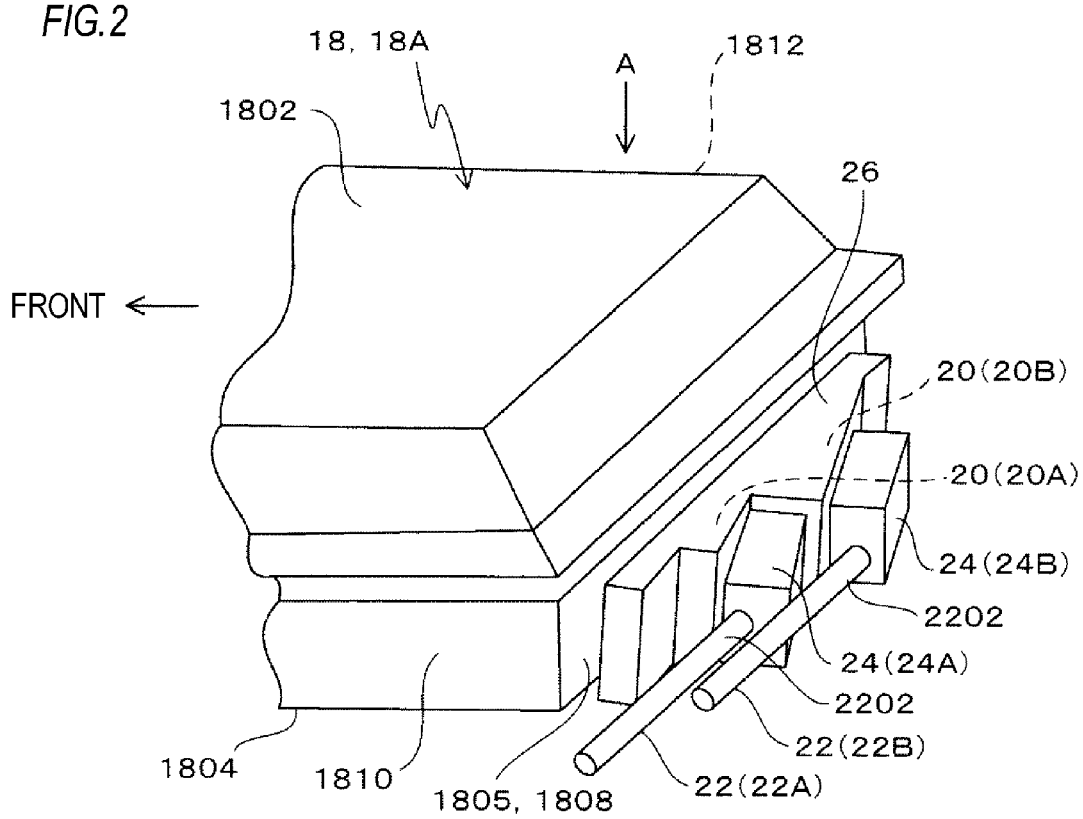
FIG. 2 is a perspective view showing a connection part between the battery pack and quick charging cables in the cable connecting structure of the battery pack according to the first embodiment.
Figure 3:
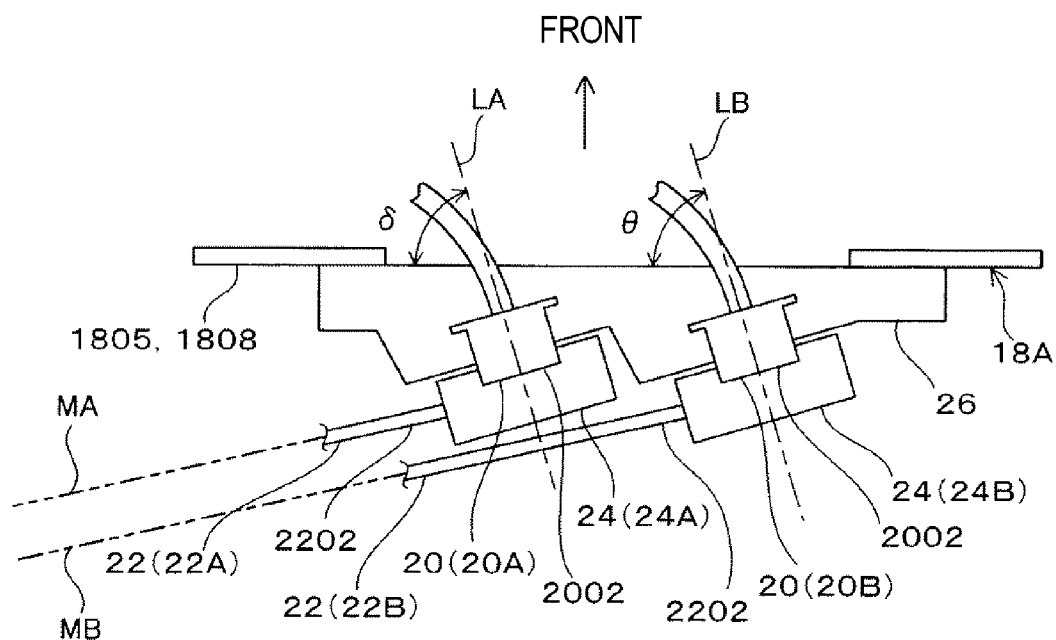
FIG. 3 is a view as seen in a direction of an arrow A in FIG. 2.

As shown in FIGS. 2 and 3, the battery pack side connector 20 includes two battery pack side quick charging connectors 20A, 20B which are adjacent to each other, namely, a positive battery pack side connector which is connected to the positive terminal of the battery via the peripheral components, and a negative battery pack side connector which is connected to the negative terminal of the battery via the peripheral components.

The two battery pack side quick charging connectors 20A, 20B are arranged in parallel along a peripheral direction of the peripheral wall 1805. In this embodiment, the two battery pack side quick charging connectors 20A, 20B are provided on the rear wall 1808 in the lateral direction of the vehicle, that is, an extending direction of the rear wall 1808.

In this embodiment, the two battery pack side quick charging connectors 20A, 20B are mounted to the rear wall 1808 via a mounting bracket 26.

Moreover, in case where the vehicle 10 is seen from the above, in a plan view, the two battery pack side quick charging connectors 20A, 20B are arranged in such a manner that their axes LA, LB are inclined with respect to the rear wall 1808.

Further, the two battery pack side quick charging connectors 20A, 20B respectively have mounting faces 2002 to which the cable side quick charging connectors 24A, 24B are mounted. These mounting faces 2002 are perpendicular to the axes LA, LB.

The cable side quick charging connectors 24A, 24B at respective ends of the two quick charging cables 22A, 22B which are connected to the quick charging port 16 are detachably mounted to the two battery pack side quick charging connectors 20A, 20B.

The two quick charging cables 22A, 22B are respectively formed of single core cables.

One of the two quick charging cables 22A, 22B is the positive side quick charging cable which is connected to a positive terminal of the quick charging port 16, and the other is a negative side quick charging cable which is connected to the negative terminal of the quick charging port 16.

The two quick charging cables 22A, 22B have a large outer diameter and high rigidity, because a large amount of electric current flows through them.

Specifically, the cable side connector 24 includes the two cable side quick charging connectors 24A, 24B, namely, a positive side quick charging connector which is connected to the positive side quick charging cable, and a negative side quick charging connector which is connected to the negative side quick charging cable.

The two cable side quick charging connectors 24A, 24B and the two battery pack side quick charging connectors 20A, 20B are constructed in such a manner that in a state where the two cable side quick charging connectors 24A, 24B are mounted to the two battery pack side quick charging connectors 20A, 20B, portions 2202 of the two quick charging cables 22A, 22B which are respectively withdrawn from the cable side quick charging connectors 24A, 24B are extended along the rear wall 1808.

In this embodiment, the cable side quick charging connectors 24A, 24B and the battery pack side quick charging connectors 20A, 20B are constructed in such a manner that in a state where the connectors are mounted to each other having their axes aligned, the respective portions 2202 of the quick charging cables 22A, 22B withdrawn from the cable side quick charging connectors 24A, 24B are perpendicular to the axes of the cable side quick charging connectors 24.

Moreover, as shown in FIG. 3, in a state where the two cable side quick charging connectors 24A, 24B are mounted to the two battery pack side quick charging connectors 20A, 20B, imaginary extensions MA, MB along extending directions of the portions 2202 of the two quick charging cables 22A, 22B which are respectively withdrawn from the cable side quick charging connectors 24A, 24B are so formed as not to intersect in a plan view of the battery pack 18. Namely, in a state where the cable side quick charging connectors 24A, 24B are mounted to the battery pack side quick charging connectors 20A, 20B, the quick charging cables 22A, 22B are extended from the cable side quick charging connectors 24A, 24B, respectively, so as to be parallel to each other.

Moreover, in this embodiment, the portions 2202 of the quick charging cables 22A, 22B withdrawn from the cable side quick charging connectors 24A, 24B which are mounted to the battery pack side quick charging connectors 20A, 20B which are inclined are so formed as to be separated from the rear wall 1808, as going away from the inclined battery pack side quick charging connectors 20A, 20B.

In this embodiment, in case where the vehicle 10 is seen from the above in a plan view, as shown in FIG. 3, an inclination angle δ of the axis LA of the battery pack side quick charging connector 20A which is close to the quick charging port 16 with respect to the rear wall 1808, out of two battery pack side quick charging connectors 20A, 20B, is larger than an inclination angle θ of the axis LB of the battery pack side quick charging connector 20B which is remote from the quick charging port 16 with respect to the rear wall 1808. Then, the portion 2202 of the quick charging cable 22B withdrawn from the cable side quick charging connector 24B which is mounted to the battery pack side quick charging connector 20B which is remote from the quick charging port 16 is positioned more rearward of the vehicle than the cable side quick charging connector 24A which is mounted to the battery pack side quick charging connector 20A which is close to the quick charging port 16, and the portion 2202 of the quick charging cable 22A withdrawn from the connector 24A, so that the portion 2202 of the cable 22B may not interfere with the connector 24A and the cable 22A.

Moreover, in case where the vehicle 10 is seen in a side view, as shown in FIG. 1, the two quick charging cables 22A, 22B are so arranged as to pass between the battery pack 18 and the rear wheel 14.

Then, operation and effects will be described.

According to this embodiment, the two cable side quick charging connectors 24A, 24B are respectively provided in the end parts of the two quick charging cables 22A, 22B, and the two battery pack side quick charging connectors 20 are provided on the rear wall 1808 in parallel with each other along the lateral direction of the vehicle which is the extending direction of the rear wall 1808.

Accordingly, as compared with a connector which is a single component to which the two quick charging cables 22A, 22B are connected, an outer size of the two cable side quick charging connectors 24A, 24B can be reduced, and an outer size of the battery pack side quick charging connectors 20A, 20B to which the two cable side quick charging connectors 24A, 24B are mounted can be also reduced.

Because the two battery pack side quick charging connectors 20A, 20B having the smaller outer size are arranged in parallel along the peripheral direction of the peripheral wall 1805, a height of the peripheral wall 1805 of the battery pack 18 can be depressed, and the battery pack 18 can be advantageously made compact.

Moreover, according to this embodiment, the two cable side quick charging connectors 24A, 24B and the two battery pack side quick charging connectors 20A, 20B are constructed in such a manner that in a state where the two cable side quick charging connectors 24A, 24B are mounted to the two battery pack side quick charging connectors 20A, 20B, the portions 2202 of the two quick charging cables 22A, 22B which are respectively withdrawn from the cable side quick charging connectors 24A, 24B are extended along the rear wall 1808.

Accordingly, the space required for wiring the two quick charging cables 22A, 22B can be reduced to the minimum, and hence, the space required for wiring the two quick charging cables 22A, 22B can be advantageously made compact.

Moreover, according to this embodiment, in a state where the two cable side quick charging connectors 24A, 24B are mounted to the two battery pack side quick charging connectors 20A, 20B, the imaginary extensions MA, MB along extending directions of the respective portions 2202 of the two quick charging cables 22A, 22B which are respectively withdrawn from the cable side quick charging connectors 24A, 24B are so constructed as not to intersect with each other in a plan view of the battery pack 18.

Accordingly, the quick charging cables 22A, 22B do not interfere with each other, and a wiring work of the quick charging cables 22A, 22B which are unlikely to be bent, having high rigidity, can be advantageously conducted with high efficiency.

Further, according to this embodiment, the respective portions 2202 of the quick charging cables 22A, 22B withdrawn from the cable side quick charging connectors 24A, 24B which are mounted to the inclined battery pack side quick charging connectors 20A, 20B are so constructed as to be separated from the rear wall 1808, as going away from the inclined battery pack side quick charging connectors 20A, 20B.

Accordingly, it is possible to secure a space between the quick charging cables 22A, 22B and the rear wall 1808, and hence, a work for wiring the quick charging cables 22A, 22B along the rear wall 1808 can be advantageously conducted with high efficiency.

Moreover, according to this embodiment, the two cables are the quick charging cables 22A, 22B which are connected to the quick charging port 16, and the two battery pack side quick charging connectors 20A, 20B to which the two cable side quick charging connectors 24A, 24B are mounted are provided on the rear wall 1808 which is directed rearward of the vehicle 10, out of the peripheral wall 1805 of the battery pack 18. Further, in case where the vehicle 10 is seen in a side view, the two quick charging cables 22A, 22B are so arranged as to pass between the battery pack 18 and the rear wheel 14.

Therefore, although the space in the rear of the rear wall 1808 of the battery pack 18 is complicated, it is possible to wire the quick charging cables 22A, 22B by extending them along the rear wall 1808 of the battery pack 18, and the wiring work in the complicated space need not be conducted. As the results, it is advantageous that the quick charging cables 22A, 22B can be easily wired.

On the contrary, in case of withdrawing the quick charging cables 22A, 22B from the rear wall 1808 along the rear part of the vehicle, it is necessary to extend the quick charging cables 22A, 22B in the longitudinal direction of the vehicle, in the complicated space behind the rear wall 1808 of the battery pack 18, which makes the wiring work of the quick charging cables 22A, 22B difficult.

Accordingly, in case where the quick charging cables 22A, 22B are wired as described in this embodiment, the wiring space for the quick charging cables 22A, 22B can be made compact, and efficiency of the wiring work of the quick charging cables 22A, 22B can be advantageously enhanced.

Moreover, in this embodiment, the quick charging cables 22A, 22B are extended along the rear wall 1808 of the battery pack 18. Therefore, as compared with a case where the quick charging cables 22A, 22B are withdrawn from the rear wall 1808 along the rearward direction of the vehicle, a force applied to the battery pack via the quick charging cables 22A, 22B can be reduced, when the vehicle 10 is collided from the rear side. As the results, protection of the battery pack 18 can be advantageously achieved.

Although in this embodiment, a case where the quick charging port 16 is provided on the vehicle body 12 at a position rearward from the battery pack 18 has been described, it is also possible to provide the quick charging port 16 on the vehicle body 12 at a position frontward from the battery pack 18.

In this case, the two battery pack side quick charging connectors 20A, 20B to which the two cable side quick charging connectors 24A, 24B of the two quick charging cables 22A, 22B are mounted may be provided on the front wall 1806 which is closer to the quick charging port 16, out of a front face and a rear face of the peripheral wall 1805 of the battery pack 18. Moreover, in case where the vehicle 10 is seen in a side view, the two quick charging cables 22A, 22B may be so arranged as to pass between the battery pack 18 and the front wheel.

In the above described structure too, the wiring space for the quick charging cables 22A, 22B can be made compact, and efficiency of the wiring work of the quick charging cables 22A, 22B can be advantageously enhanced.

Moreover, in case where the vehicle 10 is collided from the front, the force applied to the battery pack 18 via the quick charging cables 22A, 22B can be reduced, and protection of the battery pack 18 can be advantageously achieved.

Second Embodiment

Figure 4:
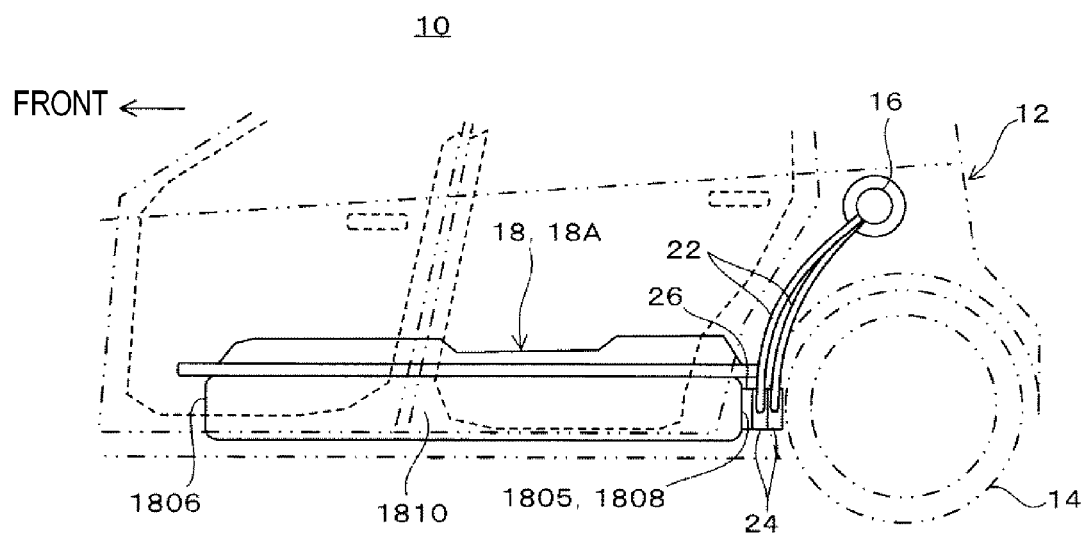
FIG. 4 is a side view showing a rearward part of a vehicle to which a cable connecting structure of a battery pack in a second embodiment is applied.
Figure 5:
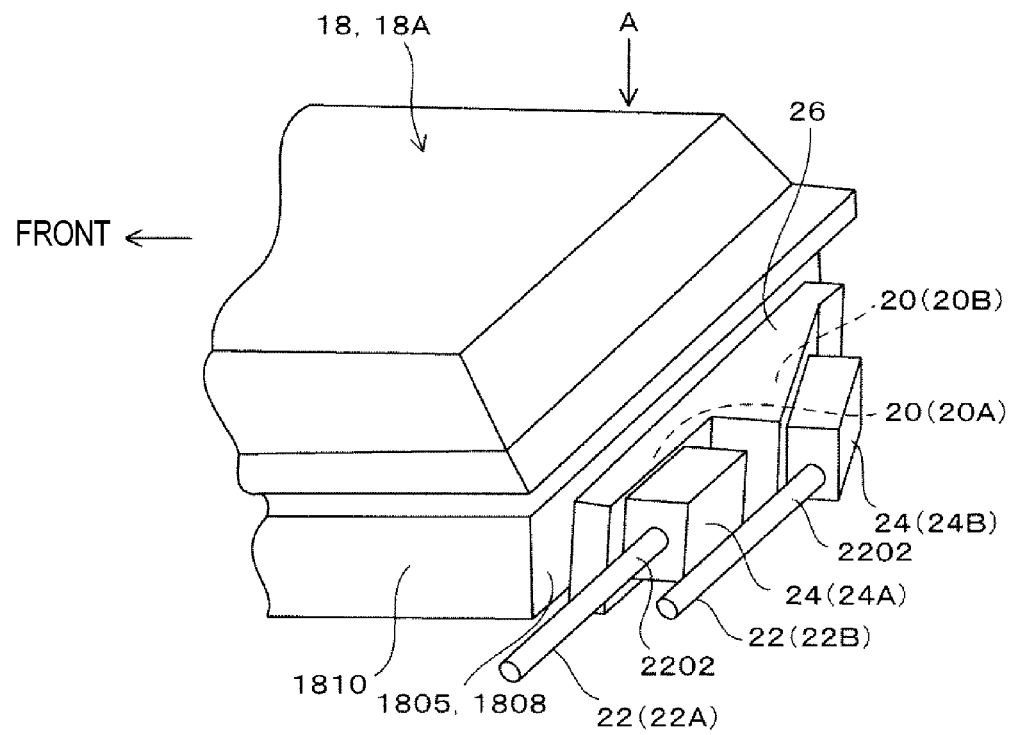
FIG. 5 is a perspective view showing a connection part between the battery pack and quick charging cables in the cable connecting structure of the battery pack according to the second embodiment.

Then, the second embodiment will be described referring to FIGS. 4 to 6.

It is to be noted that in the following embodiments, the parts and members which are substantially same as those in the first embodiment are denoted with the same reference numerals, omitting their descriptions, and only different parts are mainly described.

In the second embodiment too, in the same manner as in the first embodiment, the two battery pack side quick charging connectors 20A, 20B are provided on the rear wall 1808 via the mounting bracket 26, in parallel with each other in the lateral direction of the vehicle which is the extending direction of the rear wall 1808.

Figure 6:
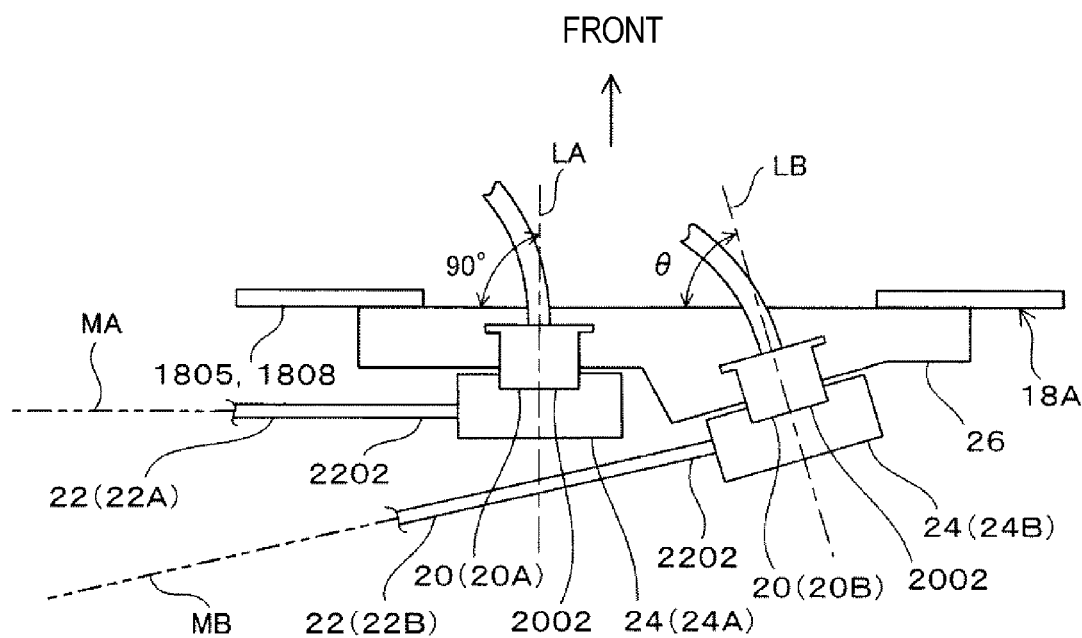
FIG. 6 is a view as seen in a direction of an arrow A in FIG. 5.

Moreover, as shown in FIG. 6, in a state where the two cable side quick charging connectors 24A, 24B are mounted to the two battery pack side quick charging connectors 20A, 20B, the imaginary extensions MA, MB along the extending directions of the portions 2202 of the quick charging cables 22A, 22B respectively withdrawn from the cable side quick charging connectors 24A, 24B which are adjacent to each other are so formed as not to intersect with each other in a plan view of the battery pack 18. Namely, in a state where the cable side quick charging connectors 24A, 24B are mounted to the battery pack side quick charging connectors 20A, 20B, the cables 22A, 22B are extended from the cable side quick charging connectors 24A, 24B in a direction in which the quick charging cables 22A, 22B are separated from each other.

Moreover, in a plan view, the axis LA of one of the battery pack side quick charging connectors 20A, 20B which are adjacent to each other is arranged perpendicular to the rear wall 1808, and the other axis LB is inclined at an inclination angle $\theta$ with respect to the rear wall 1808.

Moreover, the portion 2202 of the battery side quick charging cable 22B withdrawn from the cable side quick charging connector 24B which is mounted to the inclined battery pack side quick charging connector 20B is so formed as to be separated from the rear wall 1808, as going away from the inclined battery pack side quick charging connector 20B.

Moreover, one of mounting faces 2002 of the battery pack side quick charging connectors 20A, 20B to which the cable side quick charging connectors 24A, 24B are mounted is positioned outward from the battery pack 18, as compared with the other mounting face 2002.

Specifically, the mounting face 2002 of the battery pack side quick charging connector 20B which is remote from the quick charging port 16 is positioned more rearward of the battery pack 18 than the mounting face 2002 of the battery pack side quick charging connector 20A which is close to the quick charging port 16.

In this manner, the portion 2202 of the quick charging cable 22B withdrawn from the cable side quick charging connector 24B which is mounted to the battery pack side quick charging connector 20B is positioned rearward of the vehicle than the cable side quick charging connector 24A which is mounted to the battery pack side quick charging connector 20A and the portion 2202 of the quick charging cable 22A withdrawn from the connector, so that the portion 2202 of the cable 22B may not interfere with the connector 24A and the cable 22A.

Also in the second embodiment as described above, the substantially same advantage as in the first embodiment can be attained.

Moreover, a larger space can be secured between the rear wall 1808 and the portion 2202 of the quick charging cable 22B withdrawn from the cable side quick charging connector 24B which is mounted to the battery pack side quick charging connector 20B, which has the mounting face 2002 positioned outward of the battery pack 18, as compared with the other mounting face 2002. Therefore, a work for wiring the quick charging cable 22B along the rear wall 1808 can be advantageously conducted with high efficiency.

Third Embodiment

Figure 7:
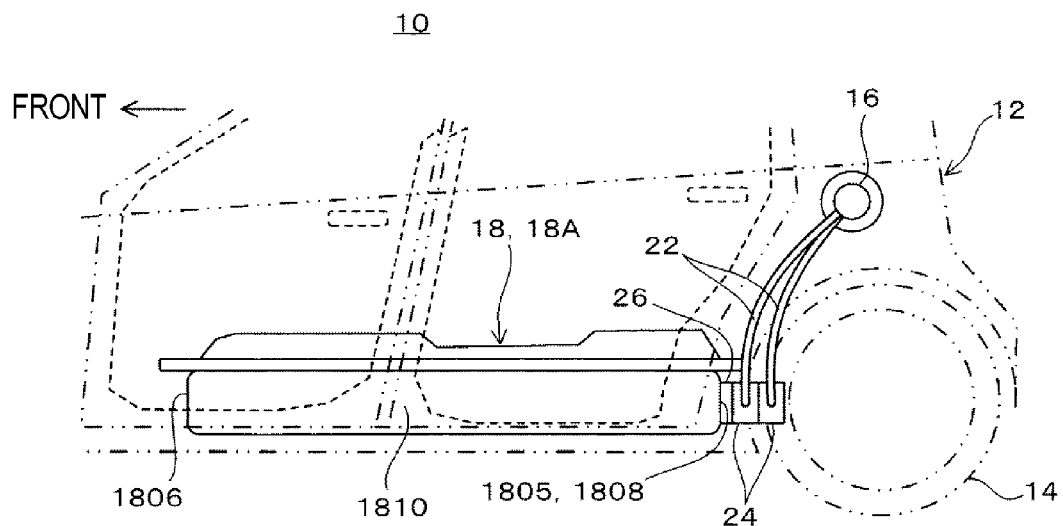
FIG. 7 is a side view showing a rearward part of a vehicle to which a cable connecting structure of a battery pack in a third embodiment is applied.
Figure 8:
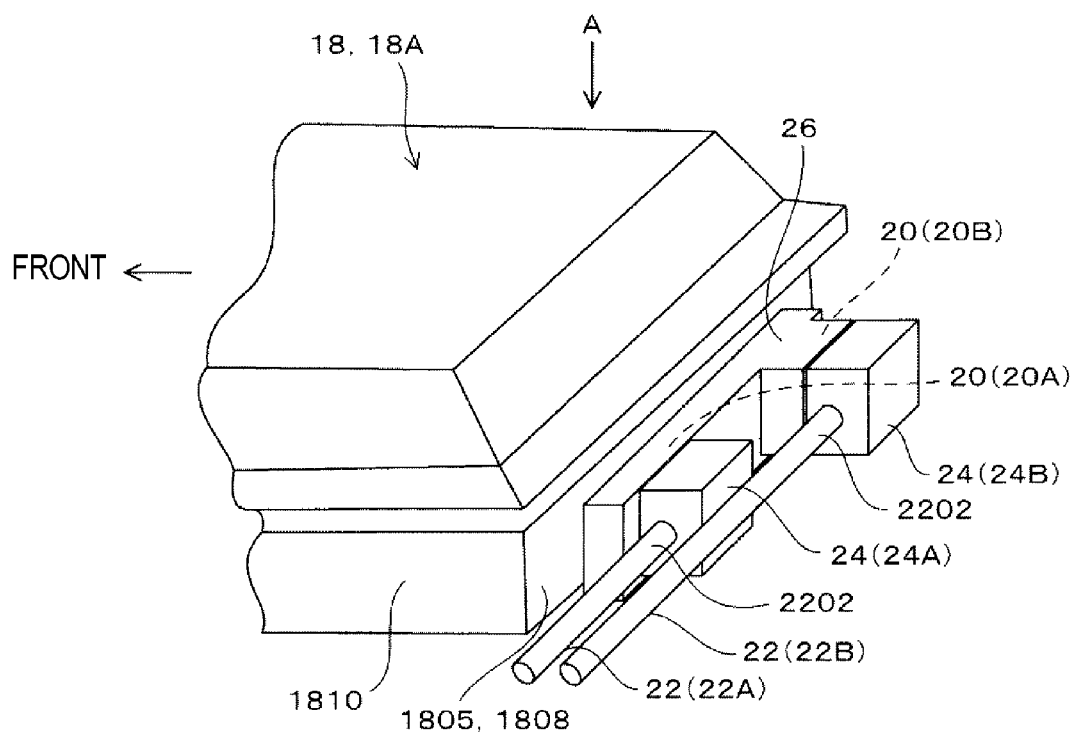
FIG. 8 is a perspective view showing a connection part between the battery pack and quick charging cables in the cable connecting structure of the battery pack according to the third embodiment.

Then, the third embodiment will be described referring to FIGS. 7 to 9.

In the third embodiment too, in the same manner as in the first embodiment, the two battery pack side quick charging connectors 20A, 20B are provided on the rear wall 1808 via the mounting bracket 26, in parallel with each other in the lateral direction of the vehicle which is the extending direction of the rear wall 1808.

Figure 9:
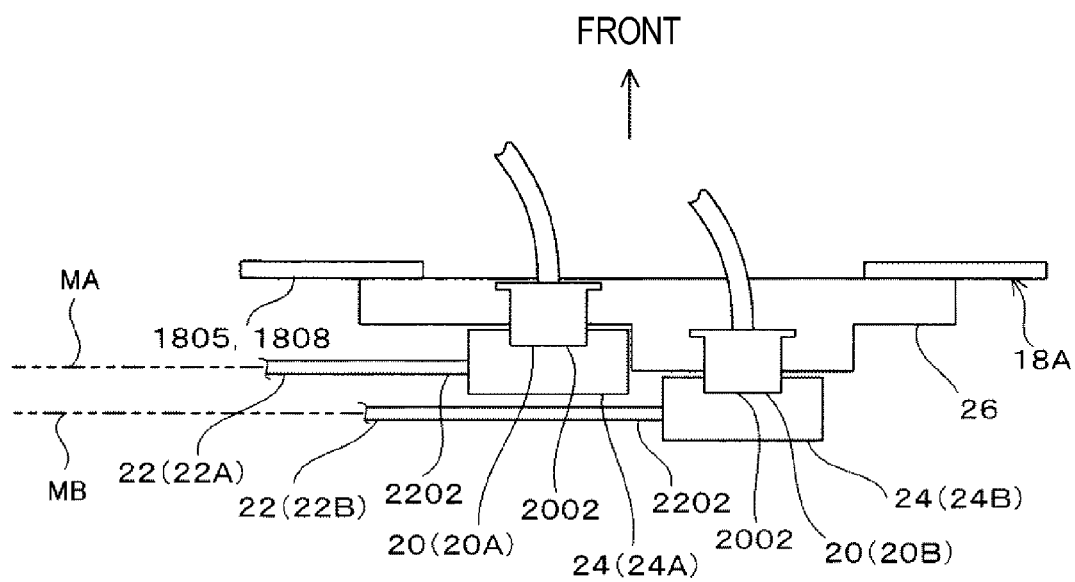
FIG. 9 is a view as seen in a direction of an arrow A in FIG. 8.

Moreover, as shown in FIG. 9, in a state where the two cable side quick charging connectors 24A, 24B are mounted to the two battery pack side quick charging connectors 20A, 20B, the imaginary extensions MA, MB along the extending directions of the portions 2202 of the quick charging cables 22A, 22B respectively withdrawn from the cable side quick charging connectors 24A, 24B which are adjacent to each other are so formed as not to intersect with each other in a plan view of the battery pack 18. Namely, in a state where the cable side quick charging connectors 24A, 24B are mounted to the battery pack side quick charging connectors 20A, 20B, the quick charging cables 22A, 22B are extended from the cable side quick charging connectors 24A, 24B, respectively, so as to be parallel to each other.

In the third embodiment, axes of the battery pack side quick charging connectors 20A, 20B which are adjacent to each other are perpendicular to the rear wall 1808.

Moreover, one of the mounting faces 2002 of the battery pack side quick charging connectors 20A, 20B to which the cable side quick charging connectors 24A, 24B are mounted is positioned outward of the battery pack 18, as compared with the other mounting face 2002.

Specifically, the mounting face 2002 of the battery pack side quick charging connector 20B which is remote from the quick charging port 16 is positioned more rearward of the battery pack 18 than the mounting face 2002 of the battery pack side quick charging connector 20A which is close to the quick charging port 16.

In this manner, the portion 2202 of the quick charging cable 22B withdrawn from the cable side quick charging connector 24B which is mounted to the battery pack side quick charging connector 20B is positioned more rearward of the vehicle than the cable side quick charging connector 24A which is mounted to the battery pack side quick charging connector 20A and the portion 2202 of the quick charging cable 22A withdrawn from the connector, so that the portion 2202 of the cable 22B may not interfere with the connector 24A and the cable 22A.

Also in the third embodiment as described above, the substantially same advantage as in the first embodiment can be attained.

Fourth Embodiment

Figure 10:
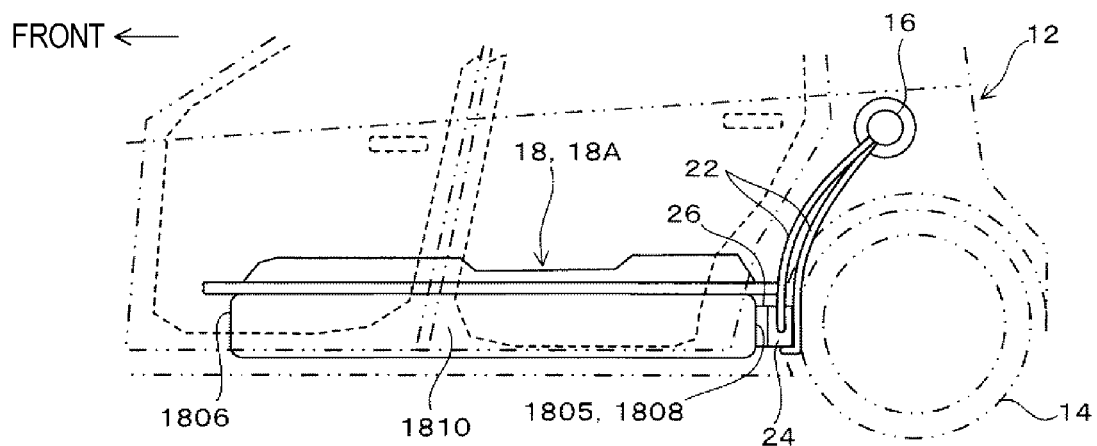
FIG. 10 is a side view showing a rearward part of a vehicle to which a cable connecting structure of a battery pack in a fourth embodiment is applied.
Figure 11:
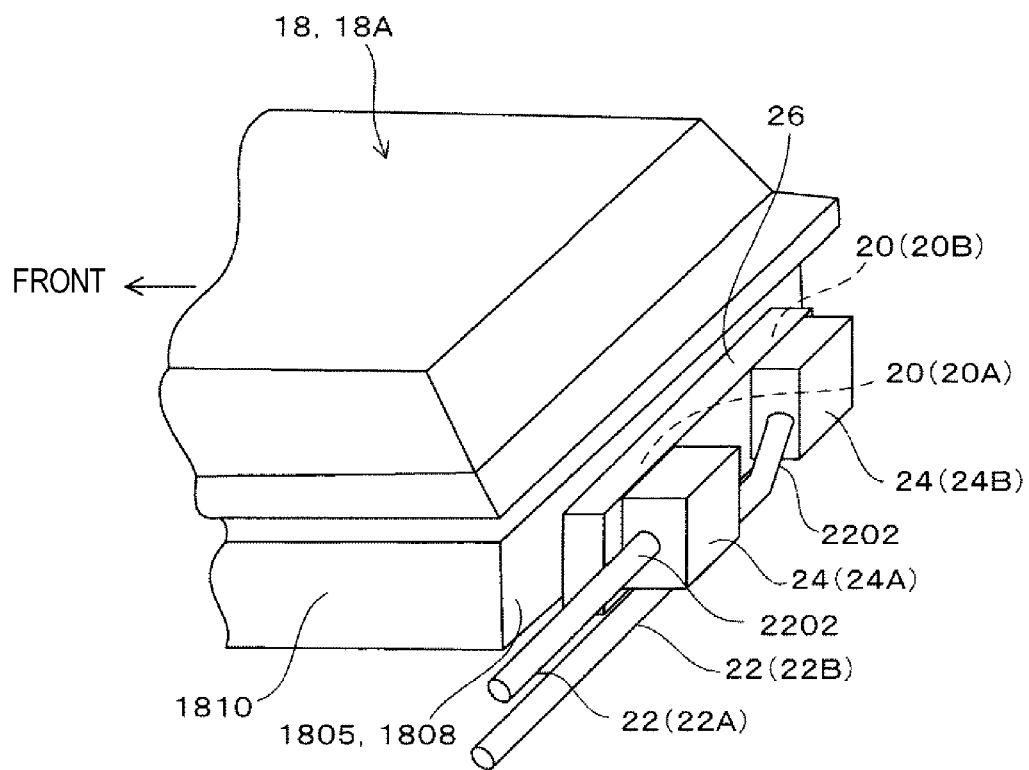
FIG. 11 is a perspective view showing a connection part between the battery pack and quick charging cables in the cable connecting structure of the battery pack according to the fourth embodiment.
Figure 12:
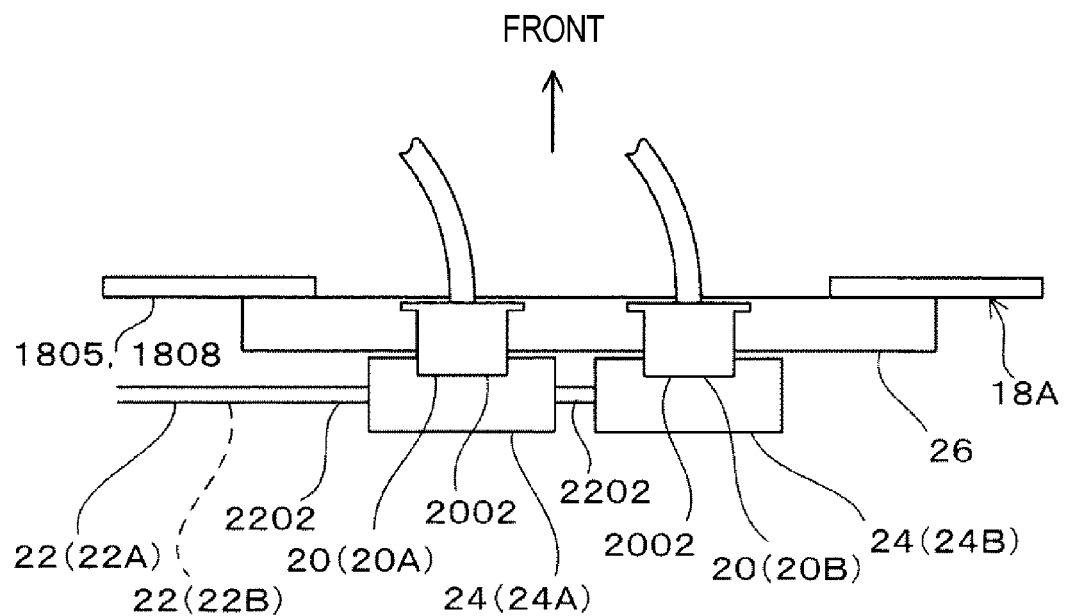
FIG. 12 is a view as seen in a direction of an arrow A in FIG. 11.

Then, the fourth embodiment will be described referring to FIGS. 10 to 12.

In the fourth embodiment too, in the same manner as in the first embodiment, the two battery pack side quick charging connectors 20A, 20B are provided on the rear wall 1808 via the mounting bracket 26, in parallel in the lateral direction of the vehicle which is the extending direction of the rear wall 1808.

In a state where the cable side quick charging connectors 24A, 24B are mounted to the battery pack side quick charging connectors 20A, 20B, the quick charging cables 22A, 22B are extended from the cable side quick charging connectors 24A, 24B, respectively, so as to be parallel to each other.

The axes of the two battery pack side quick charging connectors 20A, 20B are perpendicular to the rear wall 1808, and at the same time, the mounting faces 2002 of the two battery pack side connectors 20A, 20B are on the same position in the longitudinal direction of the vehicle 10. In other words, the mounting faces 2002 of the battery pack side connectors 20A, 20B have the same height from the rear wall 1808.

Therefore, the battery pack side quick charging connector 20B which is remote from the quick charging port 16 and the battery pack side quick charging connector 20A which is close to the quick charging port 16 are provided on the same position in the longitudinal direction of the vehicle 10.

Then, the portion 2202 of the quick charging cable 22B withdrawn from the cable side quick charging connector 24B which is mounted to the battery pack side quick charging connector 20B which is remote from the quick charging port 16 is provided in a crooked manner, so as to extend along the rear wall 1808, passing below the cable side quick charging connector 24A which is mounted to the battery pack side quick charging connector 20A which is close to the quick charging port 16.

In this manner, the portion 2202 of the quick charging cable 22B withdrawn from the cable side quick charging connector 24B which is mounted to the battery pack side quick charging connector 20B is positioned lower than the portion 2202 of the quick charging cable 22A withdrawn from the cable side quick charging connector 24A which is mounted to the battery pack side quick charging connector 20A, so that the portion 2202 of the cable 22B may not interfere with the connector 24A and the cable 22A.

Also in the fourth embodiment as described above, the substantially same advantage as in the first embodiment can be attained.

Moreover, in the fourth embodiment, both the two battery pack side quick charging connectors 20A, 20B can be provided at the same position in the longitudinal direction of the vehicle 10. Accordingly, a space in rear of the vehicle from the rear wall 1808 to be occupied by the two battery pack side quick charging connectors 20A, 20B is advantageously reduced to the minimum, and the space for wiring the two battery pack side quick charging connectors 20A, 20B can be advantageously made compact.

In this embodiment, a case where the quick charging cables 22A, 22B, the cable side quick charging connectors 24A, 24B, and the battery pack side connectors 20A, 20B are those for quick charging has been described. However, it is to be noted that these cables, cable side connectors, and battery side connectors may be those for normal charging.

Moreover, these cables, cable side connectors, and battery side connectors need not be those for charging, but may be those for power supply. In this case, the cables are connected to an electrical component which is actuated by the power supplied from the battery pack 18.

Moreover, although in this embodiment, a case where the battery pack side connectors are provided on the rear wall 1808 of the battery pack 18 has been described, it is of course possible to provide the battery pack quick charging side connectors 20A, 20B in other places than the rear wall 1808, for example, on the front wall 1806, the left and right side walls 1810, 1812.

According to an aspect of the invention, there is provided a cable connecting structure of a battery pack, the battery pack which is provided in a vehicle and to which a plurality of cables, which are respectively connected to an electrical component at one ends, are connected at the other ends, the cable connecting structure comprising: a plurality of cable side connectors which are provided at the other ends of the cables, and which are connected to the battery pack; and a plurality of battery pack side connectors to which the cable side connectors are detachably mounted, and which are arranged in parallel along a peripheral direction of a peripheral wall of the battery pack, wherein, in a state where the cable side connectors are mounted to the battery pack side connectors, portions of the cables which are respectively withdrawn from the cable side connectors extend along the peripheral wall.

According to the above structure, the plurality of battery pack side connectors are arranged in parallel along the peripheral direction of the peripheral wall of the battery pack. Accordingly, as compared with a single connector to which a plurality of cables are connected, an outer size of the respective cable side connectors can be reduced, and also, an outer size of the battery pack side connectors to which these cable side connectors are mounted can be reduced. Because the battery pack side connectors having the small outer size are arranged in parallel along the peripheral direction of the peripheral wall, a height of the peripheral wall of the battery pack can be depressed, which is advantageous in making the battery pack compact.

Moreover, in a state where the plurality of cable side connectors are mounted to the plurality of battery pack side connectors, the portions of the cables withdrawn from the cable side connectors extend along the peripheral wall. Accordingly, the space required for wiring a plurality of the cables is reduced to the minimum, and hence, the space required for providing these cables can be advantageously made compact.

In a state where the cable side connectors are mounted to the battery pack side connectors, imaginary extensions of the portions of the cables which are respectively withdrawn from the cable side connectors which are adjacent to each other may not intersect with each other, in a plan view of the battery pack.

In this structure, a wiring work of the cables which are unlikely to be bent, having high rigidity, can be advantageously conducted with high efficiency.

At least one of the battery pack side connectors which are adjacent to each other may have an axis inclined with respect to the peripheral wall, in the plan view of the battery pack, and the portion of the cable withdrawn from the cable side connector which is mounted to the battery pack side connector the axis of which is inclined may be separated from the peripheral wall, as going away from the battery pack connector the axis of which is inclined.

In this structure, a space can be secured between the peripheral wall and the portion of the cable withdrawn from the cable side connector which is mounted to the battery pack side connector, and hence, the work for wiring the cable along the peripheral wall can be advantageously conducted with high efficiency.

The battery pack side connectors may have mounting faces to which the cable side connectors are mounted, and the mounting face of one of the battery pack side connectors which are adjacent to each other may be positioned more outward of the battery pack than the mounting face of the other battery pack side connector.

In this structure, it is possible to secure a larger space between the peripheral wall and the portion of the cable withdrawn from the cable side connector which is mounted to the battery pack side connector, which has the mounting face positioned outward of the battery pack, as compared with the other mounting face. Therefore, the work for wiring the cable along the peripheral wall can be advantageously conducted with high efficiency.

The electrical component may include a charging port which is provided on an outer face of the vehicle at a front side or at a rear side of the vehicle, and to which a charging gun which is connected to an external power supply is connected, when the battery pack is externally charged, at least two of the cables may be two cables respectively connected to a positive terminal and a negative terminal of the charging port, two battery pack side connectors to which the cable side connectors of the two cables are mounted may be disposed on one of a frontward face and a rearward face of the peripheral wall of the battery pack which is closer to the charging port, and the two cables may be so arranged as to pass between the battery pack and wheels of the vehicle, in case where the vehicle is seen in a side view.

In this structure, in case where there is a complicated space in front or in rear of the peripheral wall of the battery pack, the wiring space for the cables can be made compact, by extending the cables along the peripheral wall. As the results, the wiring work of the cables in the complicated space can be omitted, and the cables can be easily wired advantageously. Moreover, when the vehicle is collided from the front side or the rear side, a force applied to the battery pack via the cables can be reduced, and as the results, protection of the battery pack can be advantageously achieved.

What is claimed is:

1. A cable connecting structure of a battery pack for a vehicle, the cable connecting structure comprising:
   a plurality of cable side connectors which are provided at ends of a plurality of cables, respectively, and which are connected to the battery pack; and
   a plurality of battery pack side connectors to which the cable side connectors are detachably connected, wherein said battery pack side connectors are arranged in parallel in a peripheral direction along a peripheral wall of the battery pack, wherein,
   the peripheral wall includes a front wall directed to a front side of the vehicle, and a rear wall directed to a rear side of the vehicle, a left side wall directed to a left side in a lateral direction, and a right side wall directed to a right side in the lateral direction, and
   the cable side connectors are connected to the battery pack side connectors, and portions of the cables which extend from the cable side connectors extend along the peripheral wall.

2. The cable connecting structure according to claim 1, wherein,
the cable side connectors are connected to the battery pack side connectors, and the cables that extend from the cable side connectors are parallel to each other.

3. The cable connecting structure according to claim 2, wherein
at least one of the battery pack side connectors has an axis inclined with respect to the peripheral wall, in a plan view of the battery pack, and
the portion of the cable extending from the cable side connector which is connected to said at least one battery pack side connector extends away from the peripheral wall.

4. The cable connecting structure according to claim 2, wherein
the battery pack side connectors have mounting faces to which the cable side connectors are connected, and
the mounting face of one of the battery pack side connectors is positioned at a different distance from the peripheral wall of the battery pack than the mounting face of another battery pack side connector.

5. The cable connecting structure according to claim 2, wherein,
the battery pack side connectors have mounting faces to which the cable side connectors are connected, and
at least two of the mounting faces of the battery pack side connectors are positioned at the same distance from the peripheral wall of the battery pack.

6. The cable connecting structure according to claim 1, wherein
at least two of the cables are respectively connected to a positive terminal and a negative terminal of a charging port of a vehicle which is connected to an external power supply, and
two battery pack side connectors to which the cable side connectors of the at least two cables are connected are disposed on one of a front face and a rear face of the peripheral wall of the battery pack.

7. The cable connecting structure according to claim 1, wherein
the battery pack side connectors are arranged spaced from each other in a first direction which is the peripheral direction along the peripheral wall of the battery pack, and
the portions of the cables which extend from the cable side connectors extend along the peripheral wall parallel to the first direction.

* * * * *